United States Patent [19]

Jacobson

[11] 4,017,042
[45] Apr. 12, 1977

[54] AIRPLANE PARCEL EJECTOR

[76] Inventor: Darwin J. Jacobson, P. O. Box 962, Port Angeles, Wash. 98362

[22] Filed: Apr. 26, 1976

[21] Appl. No.: 680,064

[52] U.S. Cl. .......................... 244/137 R; 198/484; 198/750
[51] Int. Cl.² .......................................... B64D 1/02
[58] Field of Search .................... 244/137 R, 136; 198/750, 484; 258/1.2, 1.6; 89/1.5 R, 1.5 C

[56] References Cited

UNITED STATES PATENTS

| 1,621,654 | 3/1927 | Boos | 244/137 R |
| 3,371,891 | 3/1968 | Brader et al. | 244/137 R |

Primary Examiner—Stephen G. Kunin
Assistant Examiner—Barry L. Kelmachter

[57] ABSTRACT

A parcel ejection mechanism for airdropping a parcel from an airplane includes an adjustable frame disposed on the underside of the airplane, a hoist for adjusting the frame, a carriage upon which the parcel travels and a mechanism for ejecting the parcel when the carriage reaches the end of its travel. The carriage is caused to travel along the frame by an elastic cable system attached between the airplane and the carriage. There also being a calibration device for measuring the amount of tension in the cable system.

15 Claims, 11 Drawing Figures

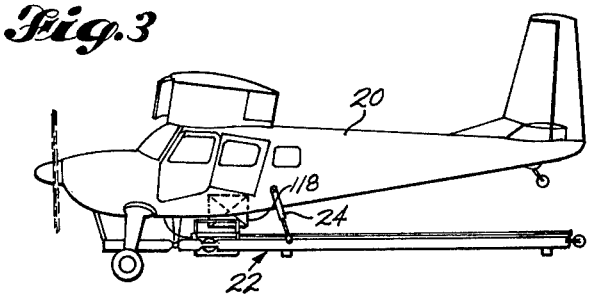
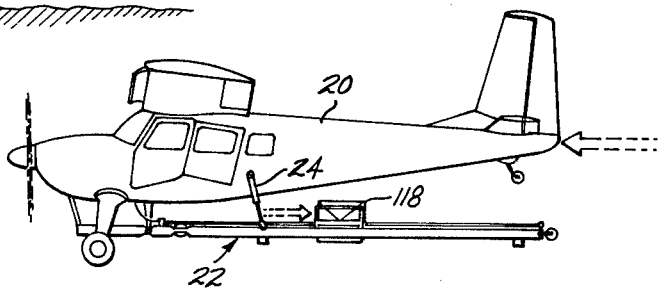
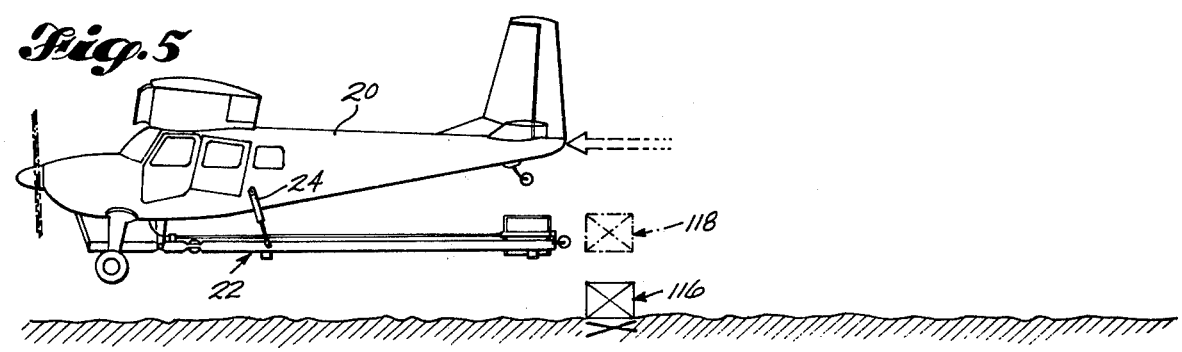
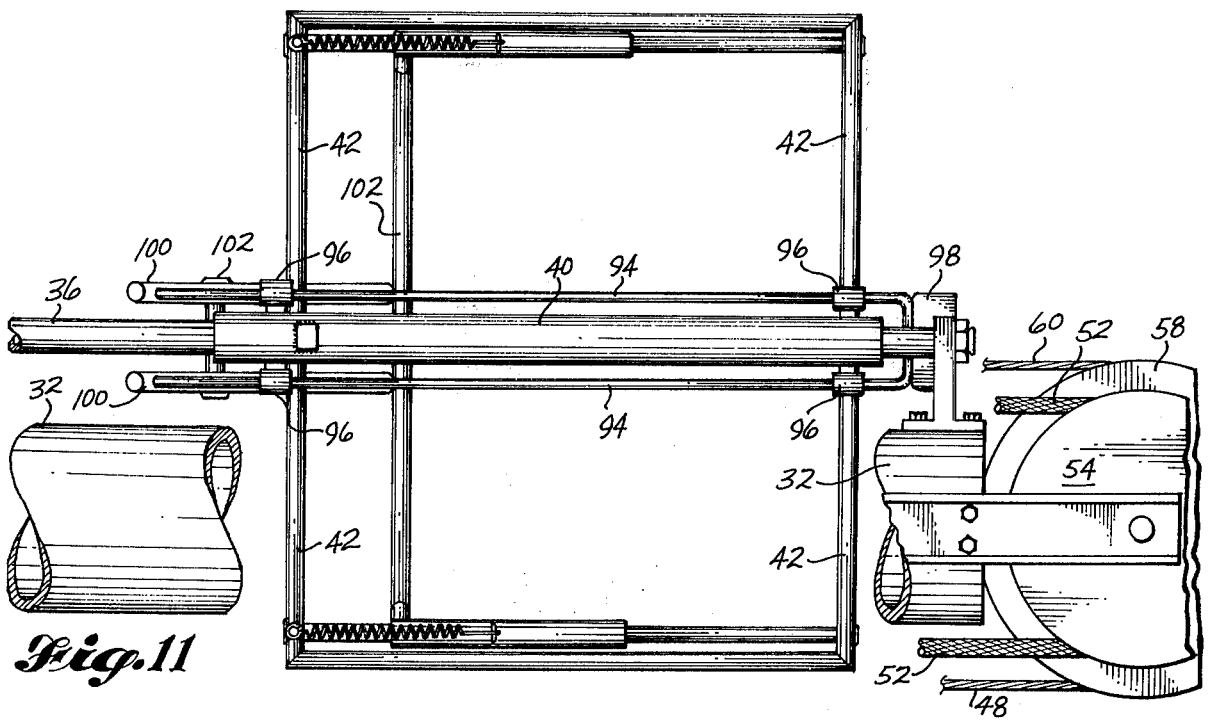

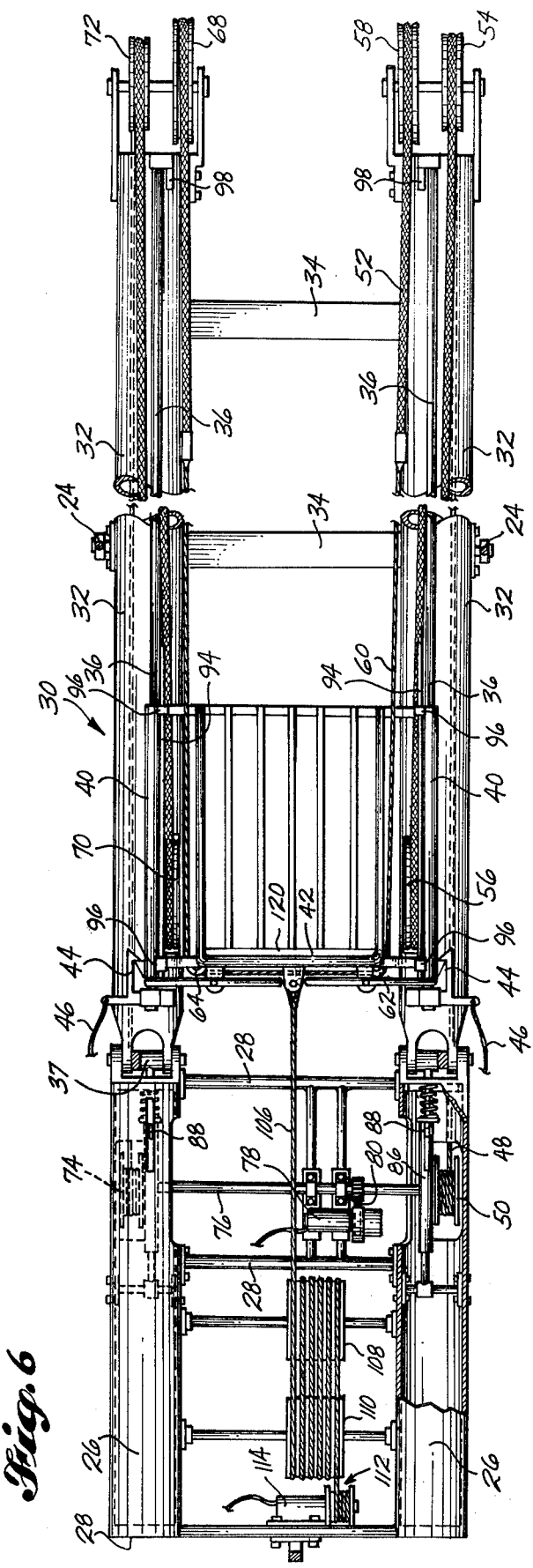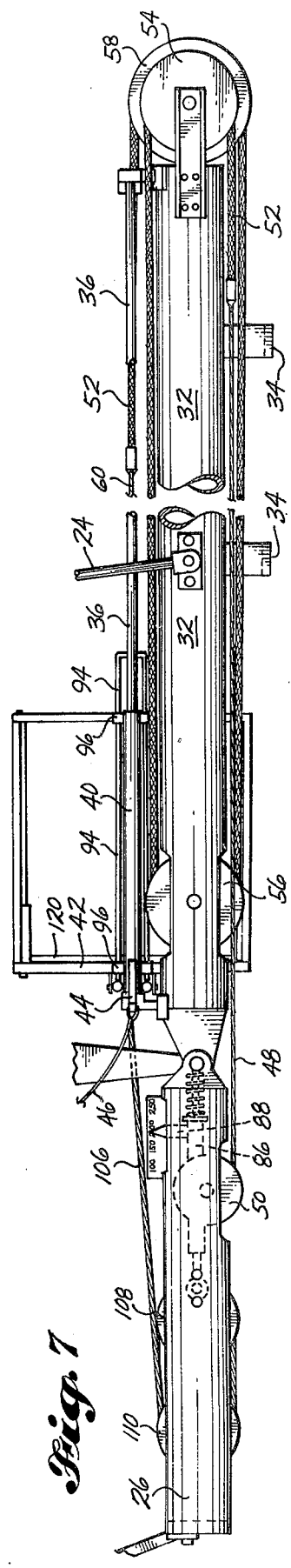

AIRPLANE PARCEL EJECTOR

BACKGROUND OF THE INVENTION

The only prior art known to applicant having any pertinency whatsoever to the present invention are the following issued U.S. Pat. Nos. 1,621,654, 1,851,305, 2,470,120, 2,481,280, 3,331,572, 2,505,707, 3,883,097, 3,167,303.

In general, it has thus been known that a parcel may be discharged from an airplane in flight if the parcels are forced to travel in a direction counter to the flight of the plane and at the same ground speed as the airplane. This contemplates the discharge of parcels from the airplane at substantially no forward or reverse ground speed so that the parcels should drop and move only vertically. The means generally used to obtain such ejection of parcels were self-propelled articles, as a bomb, air cylinders and pistons to propel the package, and angularly moving levers connected with the parcels to impart movement thereto.

SUMMARY OF THE INVENTION

In general, this invention contemplates an airplane parcel ejection mechanism which includes a frame connected with and disposed on the underside of an airplane. This frame has a section which is hinged at its forward end to the airplane and has its trailing end free. A hoist moves the free end portion of the section toward and away from the plane so that the section is toward the plane and compact during flight but the frame may have the desired horizontal position during ejection of parcels from these airplanes. The frame is provided with track means for the longitudinal travel thereon of a parcel ejection carriage. The power means to cause travela to the carriage includes a plurality of longitudinally spaced sheaves and first elastic line means reeved about the sheaves and connected at the end portions thereof to the bundle carriage and to the airplane so that upon tensioning of these elastic means, the carriage can be unlatched and will be driven by the force present in the tensioned elastic first line means.

In order to return the said first elastic line means to a start position, second elastic line means are power driven and include longitudinally spaced sheaves over which the second elastic line means are reeved.

The first elastic line means include power means mounted on a sliding carriage so that the tension in the elastic line means can be determined and adjusted to provide the desired tension in the first elastic line means and the desired propelling force to the carriage carrying the parcel to be ejected from the plane. The carriage has sides and bottom and an open top so that parcels are readily loaded in the ejection carriage while the plane is in flight.

Also, kicker rods are carried by the parcel ejection carriage so that they may engage relatively fixed stop means carried by the airplane and thus a portion of the traveling thrust of the carriage during discharge is imparted to said kicker rod means and transmitted into an ejection force, which force is used in not only absorbing such energy but in ejecting the parcel from the carriage.

The foregoing general objects of my invention, together with others explicit or implicit in the same, will become apparent as the description of my invention proceeds in connection with the accompanying drawings, wherein like reference numerals relate to like parts.

BRIEF DESCRIPTION OF THE DRAWINGS

FIG. 3 is a view on a smaller scale, showing an airplane in flight, with its relation to the ground not being in scale, and showing a parcel being moved into the basket preparatory to its discharge from the plane;

FIG. 4 is a view similar to FIG. 5 but showing the basket and parcel therein in the process of moving toward the discharge of the parcel from the plane;

FIG. 5 is a view similar to FIGS. 3 and 4 showing the discharge of a parcel from the plane and showing (not in scale) its relation to its final landing on the ground;

FIG. 6 is a plan view, with parts broken away and with parts in section, on a larger scale, showing the parcel ejection system of my invention and with the parcel ejection carriage in cocked position for discharge of the parcel;

FIG. 7 is a side elvation of the structure shown in FIG. 6;

FIG. 11 is an enlarged view, and with parts broken away, of the structure shown to the right of FIG. 10 of the drawings.

DESCRIPTION OF A PREFERRED EMBODIMENT

Figure 1:
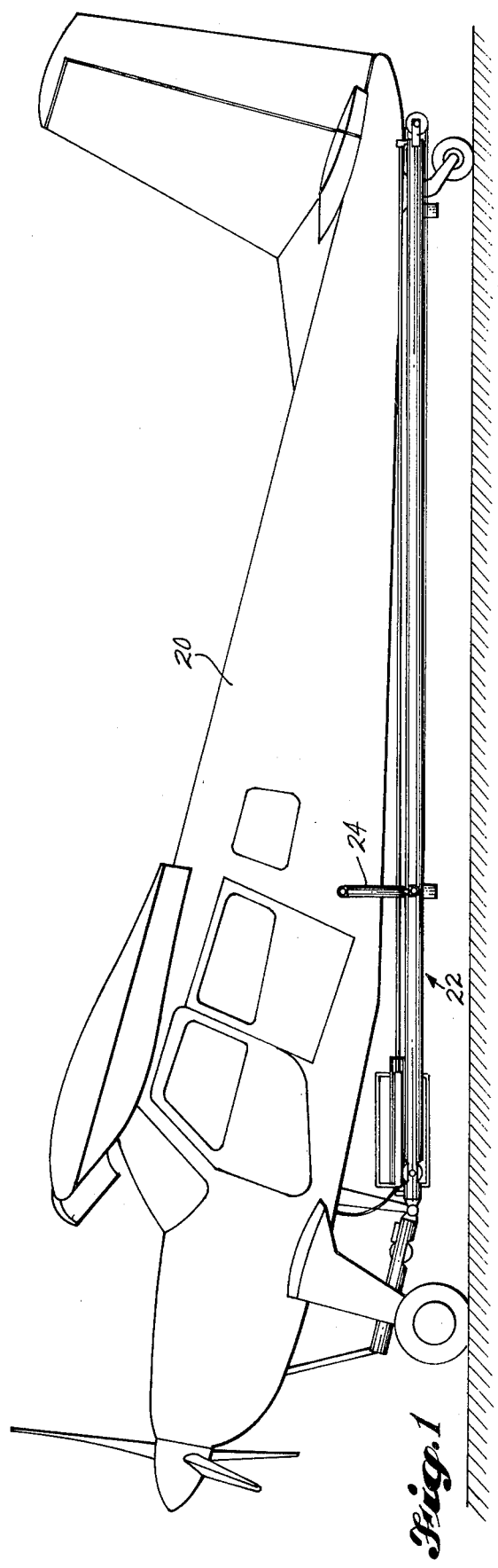
FIG. 1 is a side elevational view showing an aircraft with my invention attached thereto and with the airplane on the ground.
Figure 2:
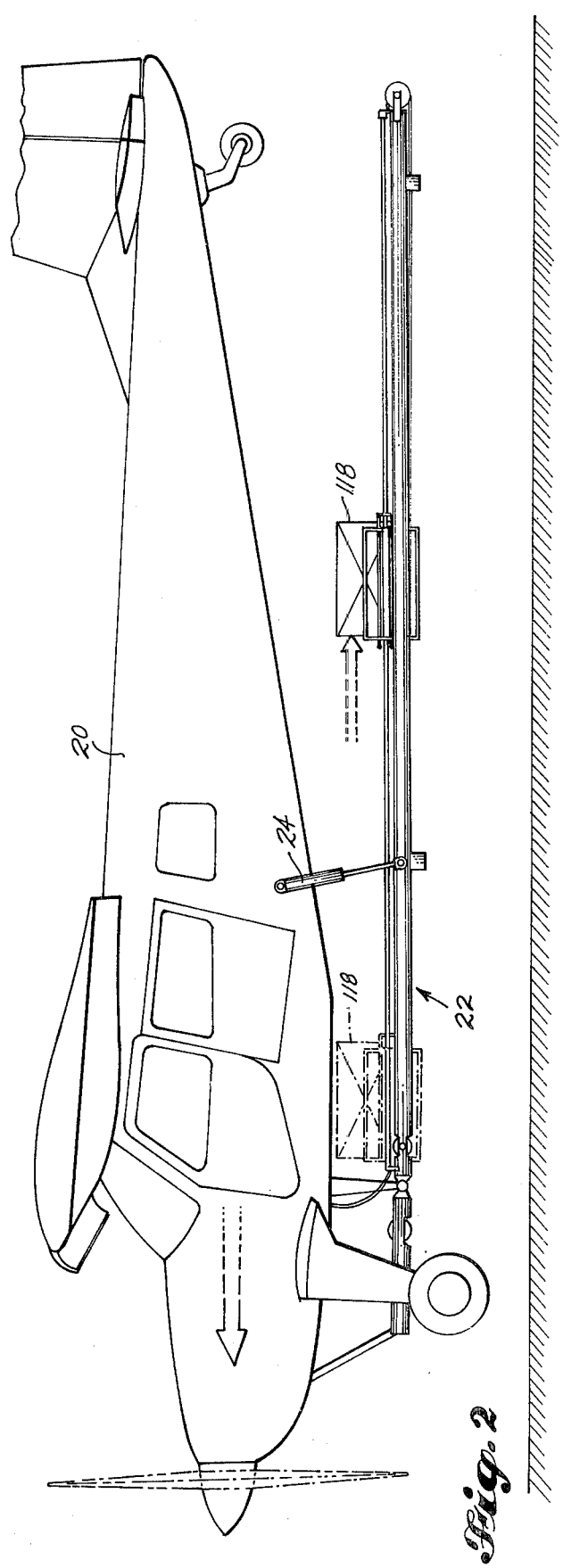
FIG. 2 is a view similar to FIG. 1 except that the airplane is in flight and with a general showing of a load or parcel being discharged therefrom.

Referring to FIGS. 1 and 2 of the drawings, an aircraft 20 has attached to its underside, structure of my invention, generally numbered 22. A hoist 24, preferably hydraulic, connects between the aircraft 20 and the structure 22 so that the structure 22 will be out of the way and not interfere with landing or not interfere when the craft is on the ground, as is illustrated by FIG. 1 of the drawings, or so said structure 22 may be in a generally horizontal position, when ready for operation, as is illustrated by FIG. 2 of the drawings.

Referring to FIGS. 6 and 7 of the drawings, longitudinal tube supports 26 and cross frame supports 28 are rigidly carried by the underside of aircraft 20. Bundle ejection frame, generally numbered 30, comprises longitudinally extending tubes 32 and crosswise extending supports 34. The bundle ejection frame 30 is pivotally connected to longitudinal tube supports 26 by spaced apart pivot means 37.

Figure 9:
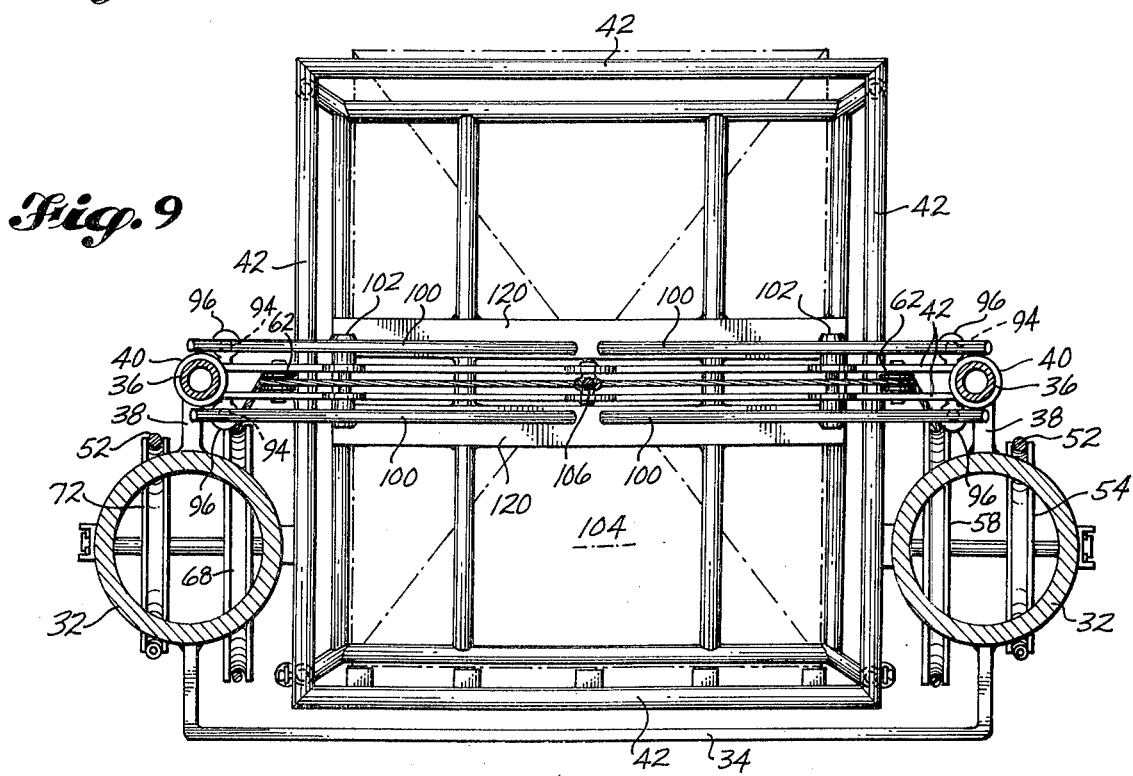
FIG. 9 is a sectional, elevational view taken substantially on broken line 9—9 of FIG. 8.

Longitudinal tubes 32 (see also FIG. 9) support longitudinal rods 36, as by arms 38 interconnecting the same and disposed at the end portions of the rods 36. Sleeves 40 are slidably mounted on rods 36. The sleeves 40 support a traveling carriage adapted to carry a parcel for ejection thereof from an aircraft as will be next described.

A parcel carriage 42 is provided with lateral side walls and a bottom wall and is formed by carriage parts connected with the sleeves 40. It is desirable that the parcel carriage 42 be open at the back, front, and top thereof, at the back to cooperate with parcel ejection means, at the front to permit ejection of a parcel out the front, and at the top to permit loading by gravity of a parcel—all of which is later herein described.

Assuming that the parcel carriage 42 is in the position shown in FIG. 6 of the drawings, then it will be locked in such position by catches 44, one on each side of the carriage and with each having an operating line 46 connected therewith and which lines extend to suitable locations so they are readily available for operation by a crew member of the aircraft 20. Also, a wire cable 48 (FIGS. 6 and 7) is connected to and woven about power drum 50, and extends therefrom and connects with elastic line 52. Elastic line 52 and other similar lines employed herein, as elastic line 66, comprise a plurality, such as 200, interlaced elastic strings, capable of stretching, when enclosed in a protective stretchable sheath (not shown), to a plurality of times their normal unstretched length and in order of three times thereof. Elastic line 52 is reeved about sheave 54 (at the exit end of the discharge mechanism), thence around sheave 56 (at the other end of the parcel discharge mechanism), and thence around sheave 58 (at the exit end) and thence connected to a second wire cable 60. This wire cable 60 extends to and around sheaves 62 at one side of the carriage 42, crosswise to the opposite side of the carriage 42, around sheaves 64 at the opposite side, and thence connected with an elastic line 66, which is the counterpart of the elastic line 52 (the only difference is that line 52 is on the opposite side of the carriage 42). Elastic line 66 extends to and around sheave 68, thence to and around sheave 70, thence to and around sheave 72, thence connected to a wire cable (the counterpart of cable 48) and which wire cable extends to and is wound around a drum 74. The sheaves 68, 70, and 72 are the counterparts of the sheaves 58, 56, and 54 and the drums 74 and 50 are driven by a common shaft 76 powered by electric motor 78 through meshing gears 80.

Electric motor 78, gears 80, shaft 76, and drums 74 are mounted on a support plate 82 which is longitudinally slidable relative to the frame parts 26 and 28. Compression springs 84, disposed on opposite sides and through shafts 86, resist tension provided by elastic lines 52 and 66. Wire cables 48 and 60 and elastic lines 52 and 66 are tied between frame parts 28, 30 and slidable plate 82 and this tension is provided when said elastic lines 52 and 66 are stretched. The amount of tension resisted by compression springs 84 will be indicated by the position of pointer 88 (FIG. 7). The scale 90 is calibrated and the motor 78 is turned or rotated an amount to provide the desired tension in the elastic lines 52 and 66 for ejection travel of the carriage 42 and the ejection of a parcel therefrom, as will be later described. In other words, the catches 44 on the two sides are moved to catch or hold position, the elastic lines 52 and 66 are tensioned the desired amount, and the parts assume the position shown in FIG. 6 of the drawings ready for the ejection of a parcel from the aircraft.

When the parts are in the position shown in FIG. 6, a crew member will simultaneously pull on lines 46 of catches 44 to release catches 44, when he desires to eject a parcel from the aircraft. The elastic lines 52 and 66 have been stretched a desired amount, (indicated by pointer 88) and will have sufficient length due to the multiple sheave system including such sheaves as 54, 56, 58, 68, 70, and 72 so that an appropriate tension thrust will be released to propel the carriage 42 toward the right in FIG. 6 (in the direction of the arrow 92 in FIG. 8) and toward the parcel discharge position. As the carriage 42 travels toward the position shown in FIG. 8 of the drawings, rods 94 (one on each side of the carriage 42, and slidingly mounted in sleeves 96 carried by carriage 42) engage rubber bumpers 98. Two kicker arms 100 are each pivoted intermediate their lengths by pivot means 102 carried by carriage 42. The outer end portions of each kicker arm 100 are in the paths of movement of rods 94 and the inner end portions of such kicker arms 100 engage with a parcel 104 in carriage 42. Thus, when the rods 94 engage bumpers 98, part of the energy to be absorbed in stopping carriage 42 is used up by urging rods 94 in the opposite direction of travel to that of carriage 42, and in turn operates kicker arms 100 and in turn ejects a parcel 104 from the carriage 42 and in a direction counter to the travel of the plane and in the same direction and at a higher speed than the former travel of the carriage 42.

Figure 8:
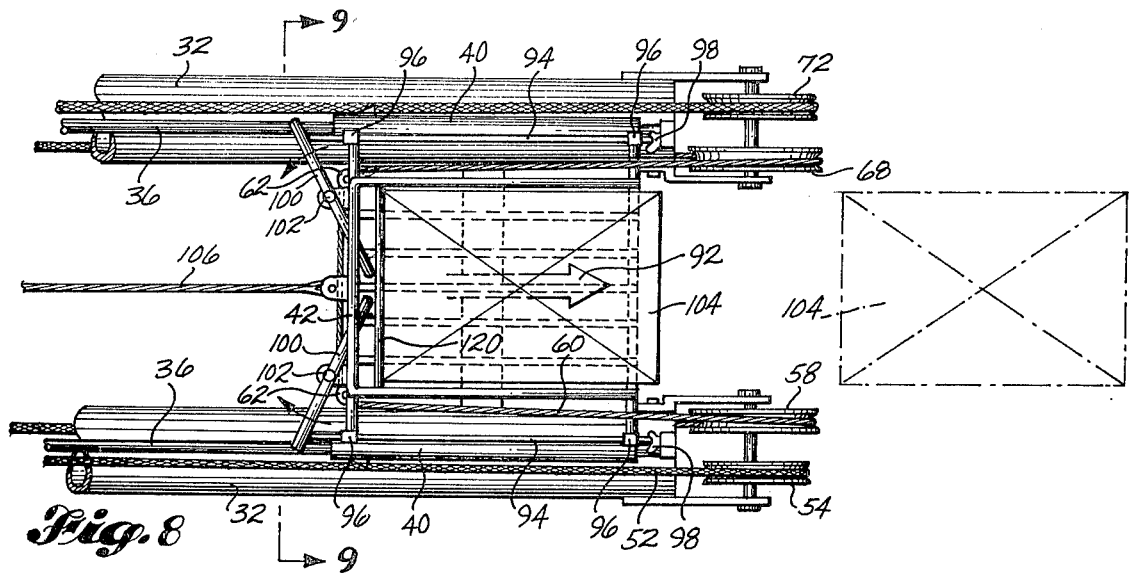
FIG. 8 is a fragmentary plan view showing the discharge portion, which is to the right of FIG. 6 of the drawings, and with the discharge basket and parcel carried thereby being in discharging position and with the parcel kicker ejecting mechanism operating to eject a parcel.
Figure 10:
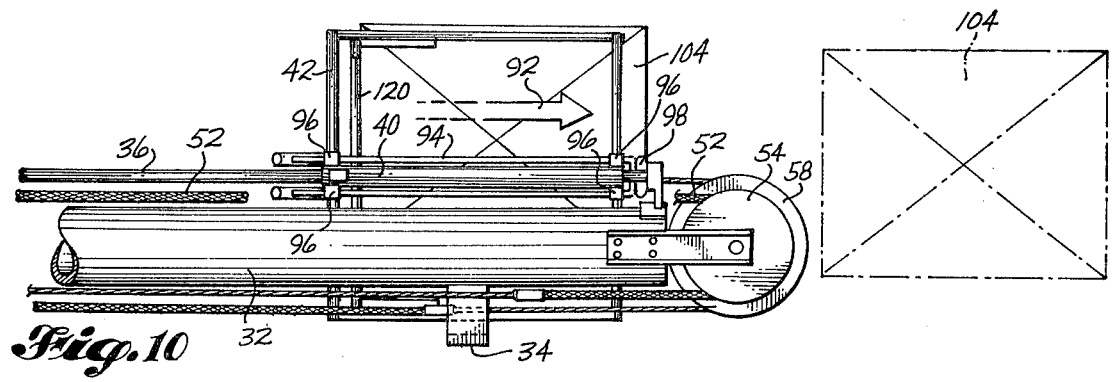
FIG. 10 is a side elevational view of the structure shown in FIG. 8.

In order to return the carriage 42 to its cocked position for ejection described in connection with FIG. 8, an elastic line 106 (see FIGS. 6 and 7) which is similar in construction to lines 52 and 66, has one end portion thereof engaged with the carriage 42, thence over sheave 108, thence around sheave 110, thence reeved about sheaves 108 and 110 a plurality of times to provide the desired length of elastic line 106 and thence to, around, and secured to drum 112, powered by electric motor 114. Each of the sheaves 108 and 110 is a multiple sheave constituting a plurality of separately movable sheave wheels. In some instances, it may be desired to rely on the amount of elastic line 106 to return carriage 42 to its starting position. However, I prefer to provide electric motor 114. Electric motor 114 is rotated or turned the amount necessary to return carriage 42 to its position shown in FIG. 6 of the drawings and then the catches 44 are engaged. Then the electric motor 114 is de-energized. The plurality of laps around multiple sheaves 108 and 110, elastic line 106 provide for the desired length of line to return carriage 42 to its cocked position or starting position and with a use of overall minimum space. However, the number of turns around such multiple sheaves 106 and 110 should be the minimum required as any excess number of turns will provide for an increase of friction as the carriage 42 moves toward its parcel ejection travel previously described.

Electric motor 114 and/or drum 112 preferably has a brake mechanism (not shown) limiting turning or rotary movement to one direction while returning the carriage 42 to the cocked position shown in FIG. 6 of the drawings. During the ejection travel of the carriage 42, the line 106 must be sufficiently long so that it will stretch sufficiently to permit such travel and without providing undue or excess tension thereon while the carriage 42 travels from the position shown as its cocked position in FIG. 6 of the drawings to its ejection position shown in FIG. 8 of the drawings.

When the carriage 42 and associate parts are in the positions shown in FIG. 6 of the drawings, an aircraft crew member can readily deposit a parcel 104 in the carriage 443, as such carriage 42 is open at the top. Preparatory to ejecting a parcel 104, the apparatus 22

(see FIGS. 1 and 2) is moved by the hoist 24 from the position shown in FIG. 1 to that shown in FIG. 2. Then the aircraft 20 is flown at the desired altitude and desired speed toward the predetermined drop ground site indicated by 116 on FIG. 5 of the drawings. When the plane approaches such ground site and at a preceding time interval sufficient only for the apparatus of this invention to operate, the parcel is ejected at a speed equal and opposite to that of the forward ground speed of the aircraft 20. Thus, the parcel 104 may be ejected from the plane at the location 118 at no forward or reverse ground speed and will drop vertically to its predetermined drop ground site 116. Of course, the pressure, indicated by the pointer 88 (FIG. 7), must be adjusted and the various factors, considered in making such adjustment, will be the relative speed of the aircraft to the ground, tail and head winds that may be involved, and the like.

SUMMARY

It will now be obvious that I have provided an airplane parcel ejector mechanism comprising a bundle ejection frame 30 adapted to be secured to, carried by, and to extend longitudinally of the underside of an airplane. Preferably, the bundle ejection frame 30 has a section which is pivotally connected to the underside of the airplane by spaced apart pivot means 37 so that the carriage can assume an in-flight position with the carriage close to the plane as illustrated in FIG. 1 of the drawings or with the carriage substantially in horizonal position during discharging as illustrated in FIG. 2 of the drawings. The means to propel the parcel carriage 42 in parcel ejection direction and to eject the parcel 104 therefrom comprises longitudinally spaced sheaves as sheaves 54, 56, 58, 68, 70, and 72 and elastic lines 52, 66 reeved thereabout and which elastic line, connected between the carriage 42 and the airplane, provides the power means for driving the carriage 42 during its parcel ejection travel. By having the combination of the sheaves with the elastic line, an elastic line of sufficient length to provide the desired tension force can be readily provided and within the limits permitted by a carriage on the underside of airplanes, even though the overall longitudinal length under specific airplanes may be relatively short. The releasable catch means 44 are provided and preferably on both sides of the airplane permitting the carriage 42 to be released by a member of the crew of the airplane after the elastic lines 52, 66 have been suitably tensioned.

The prime means for supporting the carriage 42 for travel preferably comprises sleeves 40 slidably mounted on laterally spaced guide rods 36 which extend longitudinally of the frame means and of the airplane. Also, there is preferably provided in combination with said longitudinal rods 36, longitudinally extending tubular members 32 which are interconnected with the rods by way of arms 38. (FIG. 9) Also, crosswise extending supports 34 complete the track means on which the carriage travels. The carriage is preferably mounted on said longitudinally extending rods 30 by way of two laterally spaced apart sleeve means 40 which carry the carriage 42. The parcel carriage 42 comprises bottom and side walls and is preferably without a top or front walls. The absence of a top permits readily dropping of a parcel 104 into the carriage for discharge.

In order to dissipate the energy of the traveling carriage after it has traveled its useful length and to use the energy in ejecting the parcel 104 from the carriage 42, I have provided pivoted lever parcel ejecting or kicker arms 100 which are pivoted on pivot means 102 carried by the carriage 42. Preferably, there is a kicker arm on each side and also preferably the elastic means for driving the carriage 42 are provided on both sides of the carriage. The inner end portions of the kicker arms 100 are of a length to engage with a parcel abutting thereagainst and in the carriage 42. In order that the inner ends of the arms 100 do not damage a parcel, preferably, a longitudinally slidable plate 120 is provided toward the rear end portion of the carriage 42 and the parcel 104 placed directly against such sliding rear plate. Thus, the inner ends of the arms 100 will push against the parcel 104 through the protection of the sliding rear plate 120.

Also, preferably, the outer ends of the arms 100 are arrested in their movement by engaging pusher rods or kick rods 94 which are slidably carried by the carriage 42 by use of sleeves 96. The advancing end portion of the rods 94 engage with rubber stop bumpers 98 and thus the bundle carriage 42 comes to rest by expending its final energy in providing a thrust moving the parcel 104 from the carriage 42.

Preferably, the elastic line 52, 53 is provided with wire cable portions 60 which are not elastic and are formed of woven wire strands. Thus, the terminal portions of such elastic lines 52, 66 and the intermediate portion which traverses the plane crosswise are formed of a type of material designed to withstand wear. Also, when the cable portion travels transversely of the airplane, it travels about sheave means, such as sheaves 62, 64.

The connection between the elastic lines 52 and 66 with the airplane are provided through drums 50 and 74 spaced on opposite sides of the plane. These drums 50 and 74 are mounted on a common shaft 76, all of which are mounted on a sliding plate 82. Compression springs 84 react against tension in the elastic lines 52, 66 and the amount of tension on such elastic lines 52, 66 is reflected by the relative position of the pointer 88. Thus, the electric motor 78 may be caused to turn an amount which will reflect a desired spring tension on pointer 88 so that the amount of thrust to be imparted by such elastic lines 52 and 66 can be determined and coordinated with the relative ground speed of the airplane, and forward and reverse wind speeds can be also considered.

Preferably, power means are provided to return the carriage 42 to cocked position with some tension on elastic lines 52, 66. This is preferably in the nature of a plurality of spaced apart sheaves as sheaves 108 and 110 and an elastic line 106 reeved about said sheaves and connected with a powered drum 112. As the line 106 is an elastic line and will be tensioned as the carriage 42 moves to parcel ejection position, a force will be created tending to return the carriage 42 to cocked position after parcel ejection.

Obviously, changes may be made in the forms, dimensions, and arrangement of the parts of my invention without departing from the principle thereof, the above setting forth only preferred forms of embodiment of my invention.

I claim:

1. An airplane parcel ejector mechanism comprising frame means adapted to be secured to, carried by, and to extend longitudinally of the underside of an airplane; a parcel carriage mounted for travelaing movement longitudinally of said frame means; a plurality of longitudinally spaced sheave means; elastic line means having one end portion thereof connected with the airplane, being reeved about said sheave means, and having the other end portion thereof connected with said carriage; elastic line tensioning means providing tension in said elastic line means; releasable catch means for holding said elastic line tensioning means while under tension; and release means for said catch means providing for release thereof and permitting the elastic line means to impart a propelling force on said parcel carriage.

2. The combination of claim 1, wherein said frame means comprises a frame section pivotally connected at its forward end portion to said airplane, and hoist means moving the free end portion of said frame section toward said airplane.

3. The combination of claim 1, wherein said frame means comprises laterally spaced guide rods extending longitudinally of the frame means.

4. The combination of claim 3, wherein said frame means further comprises laterally spaced tubular members extending longitudinally of the airplane, arm members connecting the guide rods and the tubular members, and cross supports interconnecting said laterally spaced guide rods and tubular members providing an open central passageway for travel of the parcel carriage longitudinally of the airplane.

5. The combination of claim 1, wherein said parcel carriage comprises bottom and side walls and without top and front walls.

6. The combination of claim 5, wherein pivoted lever parcel ejector means is carried by said parcel carriage, with an outer end portion projecting from said parcel carriage and with an inner end portion extending into the parcel carriage to engage with a parcel abutting thereagainst; and lever operating stop means positioned in the path of travel of the outer end portion of the parcel ejector means permitting the outer end portion of the lever ejector means to engage with said stop means, stop the travel of the parcel carriage, and impart a thrust against a parcel in said parcel carriage by turning of said pivoted lever ejector means.

7. The combination of claim 6, wherein the outer ends of said pivoted lever ejector means project laterally from said parcel carriage and the lever operating stop means comprises a slidable rod and a cushioned stop therefor.

8. The combination of claim 1, wherein the sheave means comprises a first set of longitudinally spaced sheave means, a second set of longitudinally spaced sheave means laterally spaced as respects the first set, and with the elastic line means connected with the airplane, reeved about the first set of sheave means, thence crossways of the airplane, thence about the second set of sheave means thence connected with the parcel carriage.

9. The combination of claim 8, wherein the portions of the elastic line means connected to the plane, to the parcel carriage, and crosswise between said sheave means are nonelastic.

10. The combination of claim 9, wherein said nonelastic portions are formed of woven wire strands.

11. The combination of claim 8, wherein the connection of the elastic line means with the airplane comprises two laterally spaced drums, a cross shaft rigid with said drums, and power means for driving said cross shaft.

12. The combination of claim 1, wherein said elastic line tensioning means comprises a spring loaded sliding frame, a power driven drum mounted on said frame and connected with said elastic line means, and spring tension indicating means to indicate the tension on said sliding frame means and on said elastic line means.

13. The combination of claim 1, with a power driven drum longitudinally and forwardly spaced from said parcel carriage, and additional line means connected with said drum and with said parcel carriage for returning the parcel carriage to its forward position.

14. The combination of claim 13, wherein a plurality of spaced sheaves are disposed between said parcel carriage and said power driven drum, and said additional line means is reeved about said sheaves and about said drum.

15. The combination of claim 14, wherein said additional line means is an elastic line.

* * * * *